United States Patent [19]
Töpfer

[11] Patent Number: 6,139,416
[45] Date of Patent: Oct. 31, 2000

[54] APPARATUS FOR PRODUCING SAUSAGES

[75] Inventor: Klaus Töpfer, Büttelborn, Germany

[73] Assignee: Poly-Clip System GmbH & Co. KG, Frankfurt am Main, Germany

[21] Appl. No.: 09/325,061

[22] Filed: Jun. 3, 1999

[30] Foreign Application Priority Data

Jun. 4, 1998 [DE] Germany .............................. 198 24 980

[51] Int. Cl.[7] ..................................... A22L 11/00

[52] U.S. Cl. ............................. 452/31; 452/32; 452/34; 452/48

[58] Field of Search ..................... 452/31, 30, 32, 452/33, 34, 35, 36, 48, 29

[56] References Cited

U.S. PATENT DOCUMENTS

| | | | |
|---|---|---|---|
| 3,191,222 | 6/1965 | Townsend | 452/33 |
| 4,276,815 | 7/1981 | Peter | 452/32 |
| 4,306,334 | 12/1981 | Niedecker | 452/34 |
| 4,604,085 | 8/1986 | Martiner | 452/48 |
| 4,625,362 | 12/1986 | Kollross et al. | 452/31 |
| 4,847,951 | 7/1989 | Kollross | 452/48 |
| 4,893,377 | 1/1990 | Evans et al. | 452/34 |
| 4,914,784 | 4/1990 | Nausedas | 452/34 |
| 5,092,814 | 3/1992 | Kasai et al. | 452/32 |

*Primary Examiner*—Willis Little
*Attorney, Agent, or Firm*—Norris, McLaughlin & Marcus, P.A.

[57] ABSTRACT

Apparatus for producing sausages, including a mechanism for automatically drawing new sausage casings onto a filling tube.

20 Claims, 18 Drawing Sheets

APPARATUS FOR PRODUCING SAUSAGES

This invention relates to an apparatus for producing sausages or the like as well as a magazining device, a sausage casing magazine for this apparatus, and a residual casing remover for this apparatus.

To fill pasty filling in tubular or bag-shaped packages has long since been known. Such packages—independent of the kind of filling—are subsequently referred to as sausages, and the tubular or bag-shaped packaging casings are referred to as sausage casings. The filling itself is pasty during filling, but it may harden later on, as this is the case for instance with durable sausages.

For producing such sausages, there are used filling machines which cooperate with closing machines. In general, the filling machines have a filling tube, onto which a sausage casing closed at one end has been drawn such that the closed end of the sausage casing is disposed before the orifice of the filling tube. In the case of tubular packaging casings, the length of the sausage casing generally is dimensioned such that it is sufficient for producing a plurality of sausages. To be able to draw a fairly large length of sausage casing onto the filling tube, the sausage casing has been upset to form a caterpillar on the filling tube. When it is stretched, the sausage casing has a length of for instance 15–60 m, and takes a length of 40 to 45 cm on the filling tube, as it has been upset to form a caterpillar. Merely bag-shaped sausage casings are individually drawn onto the filling tube for producing one sausage each.

At its end close to the orifice, the filling tube is surrounded by a casing brake, which acts against the withdrawal of the sausage casing from the filling tube in that it brakes the sausage casing with an adjustable force. This can for instance be done in that the casing brake presses the sausage casing onto the outer surface of the filling tube with an adjustable force.

Before the orifice of the filling tube there is disposed a closing machine by means of which the sausage casing can be gathered to form a neck and can be crimped in this way, in order to subsequently close the sausage casing in the vicinity of the crimping point by setting closure clips. For this purpose, the closing machine comprises a crimping element and a clip means. There are known for instance spreading or hinged crimping elements as well as clip means employing stamps and dies for setting and closing closure clips.

Producing sausages by means of such filling and closing machines is done in that pasty filling is pressed through the filling tube and out of its orifice into the sausage casing closed at one end. When the sausage casing is filled in this way, further sausage casing is constantly withdrawn from the filling tube, namely against the braking force produced by the casing brake. This braking force must be overcome by the filling pressure existing in filling tube and sausage casing.

This filling pressure also influences the internal pressure existing later on in the finished sausage.

As soon as the sausage casing has been filled to an extent sufficient for a sausage, the closing machine starts to operate. Its crimping element first of all crimps the sausage casing in that the crimping element engages in the sausage casing from two opposed sides. In the case of the spreading crimping element, this is done by closing two crimping shears. After closing, the two crimping shears are moved away from each other in longitudinal direction of the filling tube, so that between the two crimping shears a casing neck free from filling is obtained, whose length is sufficient to be closed with two closure clips. By the clip means, these two closure clips are set one beside the other onto the casing neck free from filling and are closed. Subsequently, the neck is cut through between the two closure clips. The filled sausage, which is closed at both ends, is then separated from the remaining sausage casing. The cycle of filling and closing can now start for the next sausage.

Such filling and closing machines and their constituents such as filling tube, casing brake, crimping element or clip means are already known from many publications. What is particularly advantageous is a closing machine, where the various movements for a spreading crimping element and a clip means can be controlled individually. Such apparatus is described in DE-OS 196 44 074.

Important parameters of the finished sausages are their filling weight and their tautness. The tautness of a sausage depends on its internal pressure. In the case of sausages which are filled with sausage meat, the internal pressure must be sufficiently high to prevent the meat water contained in the sausage meat from accumulating and gelling. The tautness of a sausage can be adjusted via the filling pressure as described above by means of the casing brake. In the case of a spreading crimping element, the filling pressure can also be influenced in that when the crimping shears are spread, the sausage casing is or is not pulled on by the crimping shear closer to the filling tube. In the latter case, the packaging casing surrounding the filling and closed at one end is shortened in that part of the packaging casing is pulled back by the crimping shear remote from the filling tube and forms the neck free from filling. As a result, the tautness of the sausage is increased. To ensure the quality of the sausages by a sufficient tautness, and to be able to immediately recognize production errors, such as burst sausage casings, there is advantageously used an apparatus for detecting the tautness of the produced sausage, as it is described in DE-PS 196 46 721. Checking the weight in particular in the case of sausages produced from a sausage casing which is provided with imprints for the individual sausages already before filling, can be done by means of an apparatus as it is known from DE-OS 195 19 394.

As has already been mentioned, the sausage casing drawn onto the filling tube is regularly sufficient for producing a multitude of sausages. When the entire sausage casing on the filling tube is used up, filling and closing machine will automatically switch off the sausage production. Then, a new unfilled sausage casing must be drawn onto the filling tube. Since during the production of sausages the end of the filling tube usually protrudes into the closing machine, the latter must first of all be swivelled away to the side for drawing a new sausage casing onto the filling tube. Together with the closing machine, the casing brake is also swivelled away to the side. Drawing on a new sausage casing is then easily possible. Subsequently, casing brake and closing machine are again swivelled in. When the end of the sausage casing freshly drawn on is already closed, the casing brake slightly moves over the sausage casing on the filling tube without pulling back the sausage casing. As a result of the filling pressure in the first filling operation, the closed end is pushed through between the crimping flaps or shears of the closing machine.

If natural skin open at both ends is drawn onto the filling tube, the open end thereof must first of all be threaded through the casing brake and into the closing machine. There is used an apparatus which is described in the German patent application 197 16 665 and effects threading by means of a gas or liquid jet nozzle. By means of the closing machine, the at first open end of the natural skin is then closed, and the production of sausages can be started as described above.

To lose as little valuable production time as possible when placing a new unfilled sausage casing, there are known filling machines with so-called twin systems, which have two filling tubes. The filling tubes are mounted in the filling machine such that their positions can be exchanged. Only one of the two filling tubes is in a filling position, in which it serves the production of sausages in the manner described above. The other filling tube is in a waiting position, and in this position it can easily be provided with a new unfilled sausage casing. When the sausage casing on the filling tube in the filling position is used up, closing machine and casing brake are first of all swivelled away from the filling tube, and subsequently the position of the two filling tubes is exchanged by swivelling, so that the filling tube with the new and unfilled sausage casing is in the filling position. Closing machine and casing brake can then be swivelled in again. This procedure takes only 5 to 7 seconds.

On the whole, it is possible by means of the known apparatuses and methods to largely automate the production of sausages. Nevertheless, there is a demand for a further automation.

Meeting this demand is the aim of the present invention.

In accordance with the invention, this aim is achieved with an apparatus for producing sausages or the like, comprising a filling machine which has at least one filling tube with an orifice onto which a sausage casing can be drawn and be passed through the filling, in order to fill the sausage casing;

a closing machine for closing filled sausage casings or sausage casing sections, which with respect to the filling stream is disposed in the filling tube downstream of the orifice of the filling tube;

a residual casing remover for removing the unfilled rest of a sausage casing from the filling machine and/or the closing machine;

a magazine for unfilled sausage casings; and a movable gripper for withdrawing an unfilled sausage casing from the magazine and for drawing the same onto the filling tube.

Such apparatus is suited for the fully automatic production of sausages including the automatic drawing on of a new unfilled sausage casing. Even in the most advanced of the known apparatuses for producing sausages, drawing a new unfilled sausage casing onto the filling tube only takes a few seconds. This can easily lead to the wrong conclusion that by automating the drawing of a new sausage casing onto the filling tube only little productivity can be gained. But since just for the most advanced of the known apparatuses for producing sausages relatively little personnel is required, it occurs rather frequently that a pending exchange of the sausage casing is first of all overlooked, so that this results in considerable production losses. The fully automatic production of sausages including the automatic exchange of sausage casings is achieved in particular by the residual casing remover and the movable gripper, by means of which steps that have so far been performed manually can now be performed by a machine.

There is preferred an apparatus where between the closing machine and the filling machine a data or signal line is provided for transferring operating parameters such as cycle time, filling weight or diameter and filling speed from the filling machine into the closing machine. The provision of such data line is based on the knowledge that more advanced filling and closing machines are each program-controlled in dependence on the above operating parameters. The only connection between filling and closing machine has so far only consisted in a line which transfers a single pulse from the filling machine to the closing machine, which initiates the closing operation. After the closing operation has been initiated, the same takes place completely independent of the filling machine. A data line for transferring operating parameters from the filling machine to the closing machine or vice versa makes it possible to change the operating parameters during the production of sausages and at the same time render these changes effective for both machines. In addition, such data line facilitates the set-up of the machines at the beginning of the production, as the operating parameters need only be entered a single time.

In such an apparatus, the closing machine preferably has a spreading crimping element and a clip means, whose movements can be controlled individually in dependence on the operating parameters received from the filling machine. Such closing machine is already known from DE-OS 196 44 074, but the individual control of the movements described there becomes particularly expedient in connection with a data line between filling and closing machine, as then a fine tuning of filling and closing machine can be effected to optimize the production process. Such fine tuning of the movements to the operating parameters is, however, not possible in conventional cam-plate-controlled closing machines, as there the only parameter variable during the operation is the rotational speed of the cam plate.

The various variants of the apparatus for producing sausages are preferably characterized by a monitoring means, with which at least one parameter of a package produced, such as its weight or tautness, can be detected. Detecting the weight or tautness of a sausage produced and using the detected value for instance for controlling the casing brake are already known from DE-PS 196 46 721 and DE-OS 195 19 394. In connection with the fully automatic production of sausages such monitoring means gain a particular importance, as they automatically monitor the quality of the sausages produced and possibly can effect a control not only of the casing brake, but also of the filling machine or the closing machine. The latter becomes possible in particular by the above-mentioned data line between filling and closing machine. In addition, the monitoring means can be used to switch off the entire apparatus for producing sausages, for instance if a sausage casing bursts. Thus, the monitoring means considerably relieves the personnel in charge of monitoring the apparatus. On the whole, less personnel is required. This has no negative side-effects in the sense described above, as the exchange of the sausage casing is also effected automatically.

Via the data line between filling and closing machine, operating parameters can likewise be transferred from the closing machine to the filling machine. In connection with the monitoring means it is for instance possible to transfer a value for the filling weight, which has been corrected as a result of the measurement of the monitoring means, to the filling machine.

The advantages involved in the provision of a monitoring means are fully exhausted by a preferably provided control means, which is connected to the monitoring means as well as to the filling machine and/or the closing machine and is designed such that in the case of a deviation of one or more of the parameters detected by the monitoring means from corresponding desired values it effects a change of one or more of the operating parameters of filling machine and/or closing machine and switches off the same.

A preferred variant of the apparatus is characterized in that it has a casing brake, and that the residual casing remover is disposed in direct vicinity of the casing brake.

The casing brake is preferably movable relative to the filling tube such that it selectively encloses the filling tube close to its orifice or has been withdrawn from the filling tube. The residual casing remover is arranged and designed such that with the casing brake withdrawn from the filling tube it is disposed between casing brake and filling tube orifice, in order to seize and remove sausage casing present there. With such an arrangement of casing brake and residual casing remover the residual casing remover has an easy access to a sausage casing rest which is possibly still present in the casing brake or on the filling tube.

To achieve the aim there is also used a magazine for magazining unfilled sausage casings for an apparatus for producing sausages. This magazine is characterized by a plurality of holders for one sausage casing each, which preferably constitute rods onto which the sausage casings can be pushed individually. The diameter of the rods may be designed such that the rods can accommodate sausage casings of different diameters. Such rod magazine provides for an easy access to an individual sausage casing, as each sausage casing is disposed separately on its own rod.

The holders are preferably arranged to be movable such that each of them can selectively be moved to a stationary transfer position. Such stationary transfer position facilitates the mechanical withdrawal of a sausage casing from the magazine.

The holders are preferably fixed at a carrier rotatable about an axis of rotation, so that they extend parallel to the axis of rotation and to each other and all have the same distance from the axis of rotation. With such magazine it is particularly easy to selectively move each holder to the transfer position.

In the magazine, the location of the axis of rotation can preferably be adjusted both in terms of height and inclination. Thus, the magazine can exactly be aligned with respect to an adjacent filling tube of a filling machine.

In addition, the magazine preferably has a controllable drive for selectively moving the holders to the transfer position. The drive preferably drives the rotatable carrier.

A further contribution to achieving the aim is provided by a magazining device with a magazine as described above, which is characterized by a device for discharging sausage casings, which includes means for taking up a sausage casing at the transfer position, means for withdrawing the sausage casing from the magazine, and means for discharging the sausage casing at a discharge position. This discharge device preferably includes a gripper, which is longitudinally movable in a direction extending parallel to the holders for the unfilled sausage casings and can in addition be swivelled transverse to this direction. The discharge device preferably includes one separately activatable drive for opening and closing the gripper, for moving the gripper in longitudinal direction, and for swivelling the gripper. The three drives are preferably arranged such that the drive for swivelling the gripper also moves the two other drives, and that the drive for moving the gripper in longitudinal direction also moves the drive for opening and closing the gripper. The three drives are thus connected in series, so to speak. With such a gripper sausage casings can easily be withdrawn from a magazine as described above, and with a corresponding alignment of the magazine with respect to the filling tube of a filling machine can also easily be pushed onto this filling tube.

Finally, the inventive aim is also achieved by means of a residual casing remover for an apparatus for producing sausages, which has a pivotally mounted clamping arm with a clamp to be selectively opened and closed at its free end.

With such a clamp, a sausage casing rest present in the filling machine or in the closing machine can be seized and be removed from the filling machine or the closing machine by swivelling the clamping arm. Preferably, the open clamp encloses a U-shaped opening, which in the swivelled position of the clamping arm is downwardly open, in order to discard removed sausage casing. The sausage casing removed from the closing or filling machine will automatically fall out of the clamp of the residual casing remover.

The apparatus will now be explained in detail by means of the Figures, wherein:

FIG. 1 shows a fully automatic apparatus 10 for producing sausage-like packages subsequently referred to as sausages. The term sausages also includes those packages which consist of a tubular packaging casing which is closed at both ends and is for instance filled with a sealing compound or another filling.

The main constituents of the apparatus 10 are a filling machine 12, a closing machine 14 and a magazining device 16.

Figure 1:
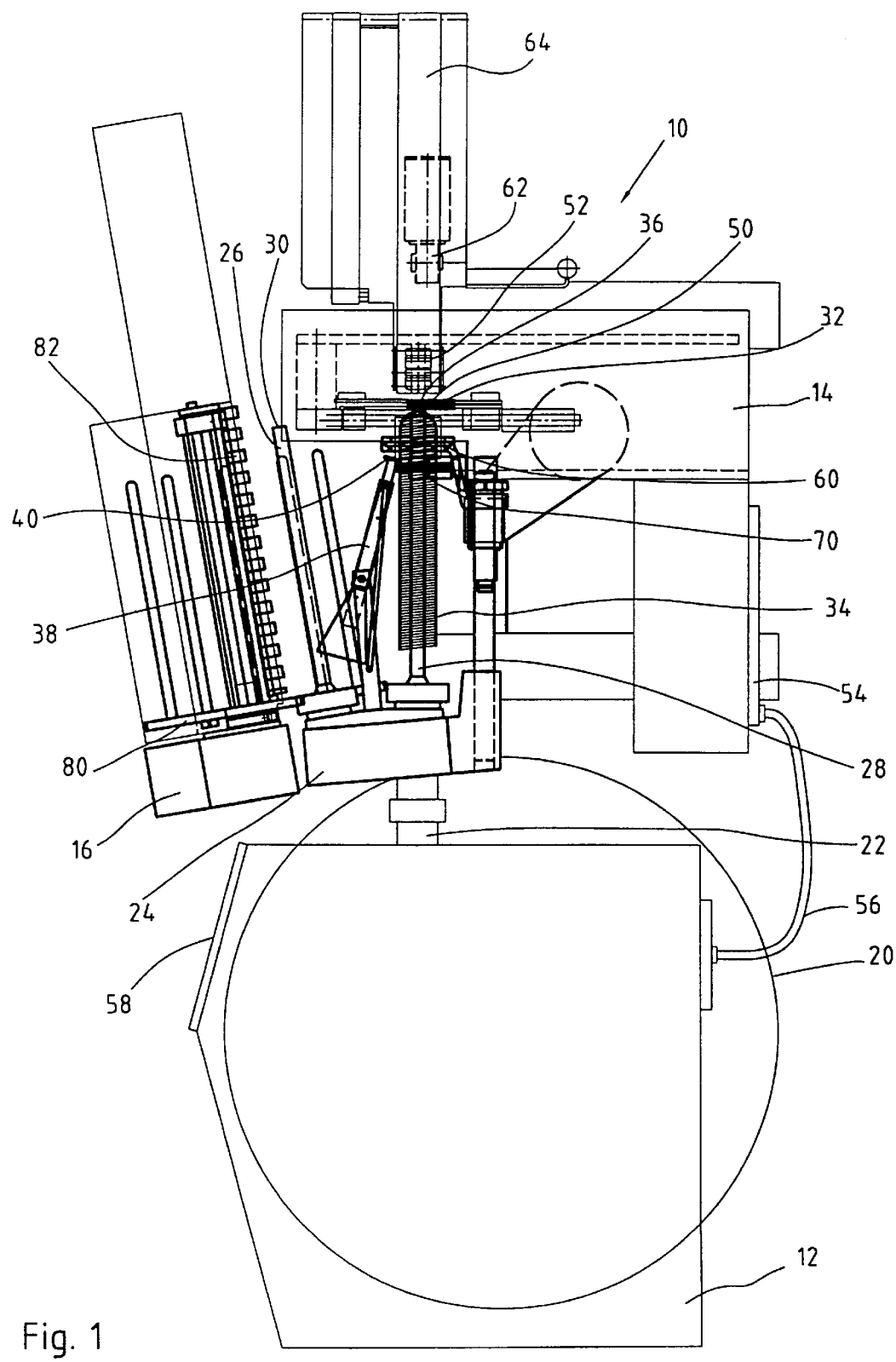
FIG. 1 shows a plant for the automatic production of sausages in a top view.

The filling machine 12 consists of a funnel-shaped reservoir 20 (in the drawing indicated by a circle) for pasty filling, which at its lower end has an outlet from which the filling can get into a delivery pump. The delivery pump delivers the filling into a delivery passage 22, which opens in a twin system 24 with two filling tubes 26 and 28. The two filling tubes are mounted at the twin system 24 such that they can exchange their positions in a swivel movement. Only one of the two filling tubes is each connected to the delivery passage 22 and is in a filling position. In FIG. 1, this is the filling tube 28, which is in alignment with the delivery passage 22. The filling tube 26 is in a waiting position. Both filling tubes 26 and 28 each have an orifice 30 and 32, respectively, at their end. Onto the filling tube 28, a tubular packaging casing 34 closed at one end—subsequently referred to as sausage casing 34—has been drawn such that its closed end 36 is disposed before the orifice 32 of the filling tube 28. The sausage casing 34 has been upset to form a caterpillar, so that it occupies a length of only 40 to 45 cm on the filling tube, although in the stretched condition its total length is about 60 m.

Apart from the two filling tubes 26 and 28, the twin system 24 also has a holding arm 38, which is pivotally mounted so as to selectively press against one of the two filling tubes 26 or 28 with its free end 40, and to retain a sausage casing 34 present there. In FIG. 1, the free end 40 of the holding arm 38 urges the sausage casing 34 against the filling tube 28 disposed in the filling position.

The closing machine 14 is equipped with a known type of spreading crimping element 50 and a clip means 52, which by means of two movable stamps and two movable dies each can simultaneously set and close two closure clips. The closing machine 14 is of the type known from DE-OS 196 44 074, i.e. the movements of the crimping element 50 when crimping a filled sausage casing and subsequently elongating the obtained neck free from filing by spreading the crimping shears as well as the movements of stamp and die when setting and closing the closure clips can each be controlled individually. For this purpose, the closing machine 14 is equipped with a control means 54. Via a data line 56, the same is in turn equipped with a corresponding control means 58 of the filling machine 12, so as to receive from the same operating parameters such as time of the day, filling weight or diameter and filling speed, and to correspondingly activate the spreading crimping element and the clip means.

With the closing machine 14 a casing brake 60 is connected, which in its position illustrated in FIG. 1 encloses the filling tube 28 in the vicinity of its orifice 32 and presses the sausage casing 34 onto the filling tube 28 from the outside. The force with which the sausage casing 34 is pressed onto the filling tube 28 can be adjusted.

Likewise mounted on the closing machine 14 is a checking means 62, which is used for detecting the tautness of a sausage produced. Variants and modes of operation of the checking means 62 are described in detail in DE-PS 196 46 721. The checking unit 62 is connected with the casing brake 60. When the measurements of the checking unit 62 indicate that the tautness of a sausage produced lies below the desired value, the casing brake 60 is readjusted in the sense that it presses the sausage casing 34 more strongly onto the filling tube 28. But when the checking unit 62 detects an excessive tautness, it acts on the casing brake 60 such that the same presses the sausage casing 34 less strongly onto the filling tube 28.

In the vicinity of the checking unit 62 there is in addition provided a conveyor belt 64 for taking away finished sausages. This conveyor belt 64 can be equipped with a weighing means for detecting the weight of the sausages produced. In accordance with DE-OS 195 19 394, this weighing means can likewise be connected with the casing brake 60, to be able to produce for instance sausages of a precise weight with a figurative imprint.

The closing machine 14 together with the casing brake 60 mounted thereon as well as the checking unit 62 and the conveyor belt 64 can be swivelled away from the filling machine 12 such that the crimping element 50 is away from the orifice 32 of the filling tube 28 and the casing brake 60 has been withdrawn from the filling tube 28. The filling tube 28 is then freely accessible and can in particular exchange its position with the filling tube 26.

Apart from the data line between closing machine and filling machine and the possible transfer of operating parameters from the filling machine 12 into the closing machine 14, the apparatus illustrated in FIG. 1—as far as it has been explained so far—operates in the known manner. By means of the delivery pump of the filling machine 12, filling is pressed into the filling tube 28, is discharged from its orifice 32 and in this way fills the sausage casing 34 closed at one end. During the filling operation, further sausage casing is withdrawn from the filling tube 28. The casing brake 60 acts against this withdrawal of the sausage casing in that it presses the sausage casing 34 onto the outside of the filling tube 28 with an adjustable force. The filling pressure with which the filling is pressed into the sausage casing 34 as well as the force required for withdrawing the sausage casing 34 from the filling tube 28 are in balance with each other and provide a corresponding internal pressure in the sausage casing 34. When a section of a sausage casing 34 has been filled sufficiently, the two crimping shears of the spreading crimping element 50 laterally engage in the sausage casing 34 and crimp the same. The two crimping shears are directly adjacent each other in longitudinal direction of the filling tube 28. Upon crimping, the crimping shear more remote from the filling tube is moved away from the crimping shear closer to the filling tube in longitudinal direction of the filling tube and thereby produces a neck free from filling in the sausage casing 34, whose length is sufficient to be closed with two closure clips. These are subsequently set by the closing means 52. Between the two closure clips the neck is cut through, so that the finished sausage is cut off from the remaining sausage casing.

By means of the checking means 62 the tautness of the sausage is checked, and the casing brake 60 is possibly readjusted as de scribed above. After producing a certain number of sausages, the sausage casing 34 drawn onto the filling tube 28 is used up. The production can then only be continued with a new, unfilled sausage casing.

The introduction of a new unfilled sausage casing in the production is effected in that this unfilled sausage casing is first of all drawn onto the easily accessible filling tube 26, which is in the waiting position, possibly before the sausage casing 34 is used up completely. As soon as the sausage casing 34 is used up, the closing machine 14 together with the casing brake 60, the checking unit 62 and the conveyor belt 64 is swivelled away from the filling tube 28 until the same is freely accessible. By means of a swivel movement the position of the two filling tubes 26 and 28 is exchanged, so that now the filling tube 26 is in the filling position. To prevent the sausage casing drawn onto the filling tube 26 from falling off the filling tube 26, it is retained by the holding arm 38. Before the closing machine 14 is again swivelled towards the filling machine 12, the unfillable rest of the sausage casing 34 must be removed from the closing machine 14. Subsequently, the closing machine 14 is again swivelled towards the filling machine 12. The casing brake 60 is automatically moved onto the filling tube 26 and the fresh, unfilled sausage casing drawn onto the same. The production can now start again.

In addition to the known constituents the apparatus 10 of FIG. 1 includes a residual casing remover 70, which is mounted in direct vicinity of the casing brake 60 on a bracket 72 which also carries the casing brake 60. When the casing brake 60 is withdrawn from the filling tube 28 by swivelling the closing means 14, the residual casing remover 70 correspondingly follows this swivel movement. It is then disposed between the orifice 32 of the filling tube 28 and the casing brake 60. The residual casing remover 70 is represented in greater detail in FIGS. 2 to 4 and is explained in detail in the description of these Figures.

In addition, the apparatus 10 of FIG. 1 includes a pin magazine 80 as part of the magazining device 16, which is used for magazining unfilled sausage casings. A further constituent of the magazining device 16 is a gripper 82, by means of which a sausage casing can be withdrawn from the pin magazine 80 and be pushed onto the respective filling tube which is not in the filling position. The design of the pin magazine 80 is explained in detail in the description of FIGS. 5 to 7. The mode of operation of the pin magazine 80 can be taken from FIGS. 9 to 13 and 14 to 19 as well as from the associated description.

First of all, however, the residual casing remover 70 should be explained in detail with reference to FIGS. 2 to 4. These Figures not only illustrate the residual casing remover 70, but also the casing brake 60. As has already been mentioned both are mounted at a common bracket 72, which in turn is mounted at the closing machine 14.

The residual casing remover 70 has a pivotally mounted clamping arm 90, at whose free end there is disposed a clamp 92 with two clamping jaws 94 and 96. The clamp 92 can be opened and closed by means of a first pneumatic cylinder 98. To this end, the first pneumatic cylinder 98 drives the clamping jaw 96 by means of its drive rod 99. At its end opposite the clamp 92, the clamping arm 90 is mounted in a swivel bearing 100. A lever 102 is angularly fixed at the clamping arm 90 in the vicinity of the swivel bearing 100. The free end of the lever 102 is acted upon by a second pneumatic cylinder 104 with its drive rod 105. The second pneumatic cylinder 104 is used for swivelling the clamping arm 90 and is supported in a supporting bearing 106, which is disposed at a holder 108, by means of which the entire residual casing remover 70 is mounted at the bracket 72.

Figure 2:
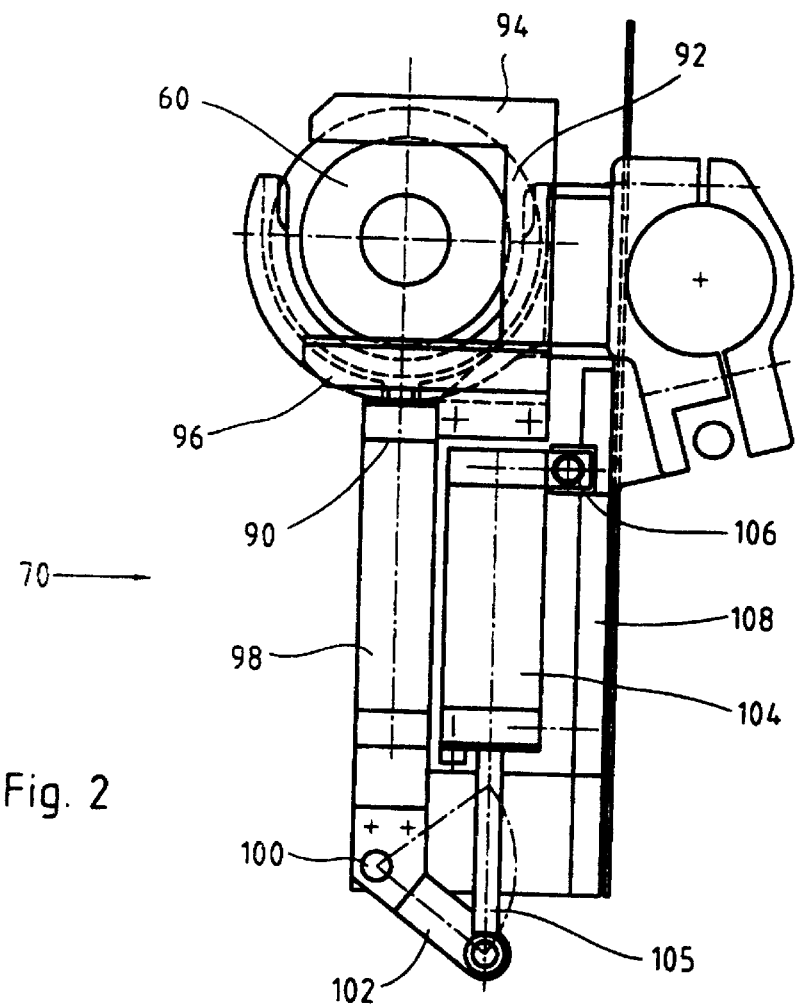
FIG. 2 shows a residual casing remover and a casing brake in a side view.

FIG. 2 shows the residual casing remover 70 in its position during the filling of sausages. The clamp 92 is open, and the two clamping jaws 94 and 96 are above or below the filling tube not represented in the Figure. The clamp 92 is disposed before the casing brake 60, as seen from the filling machine 12.

Figure 3:
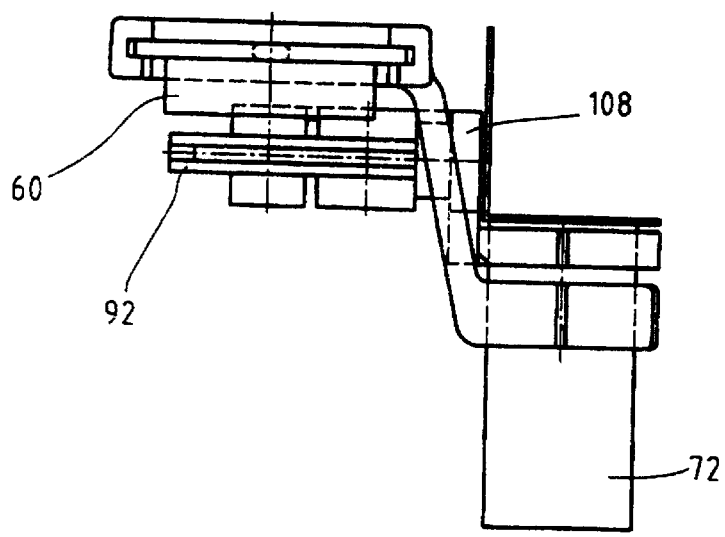
FIG. 3 shows the residual casing remover and the casing brake of FIG. 2 in a top view.

FIG. 3 shows the situation represented in FIG. 2 in a top view.

Figure 4:
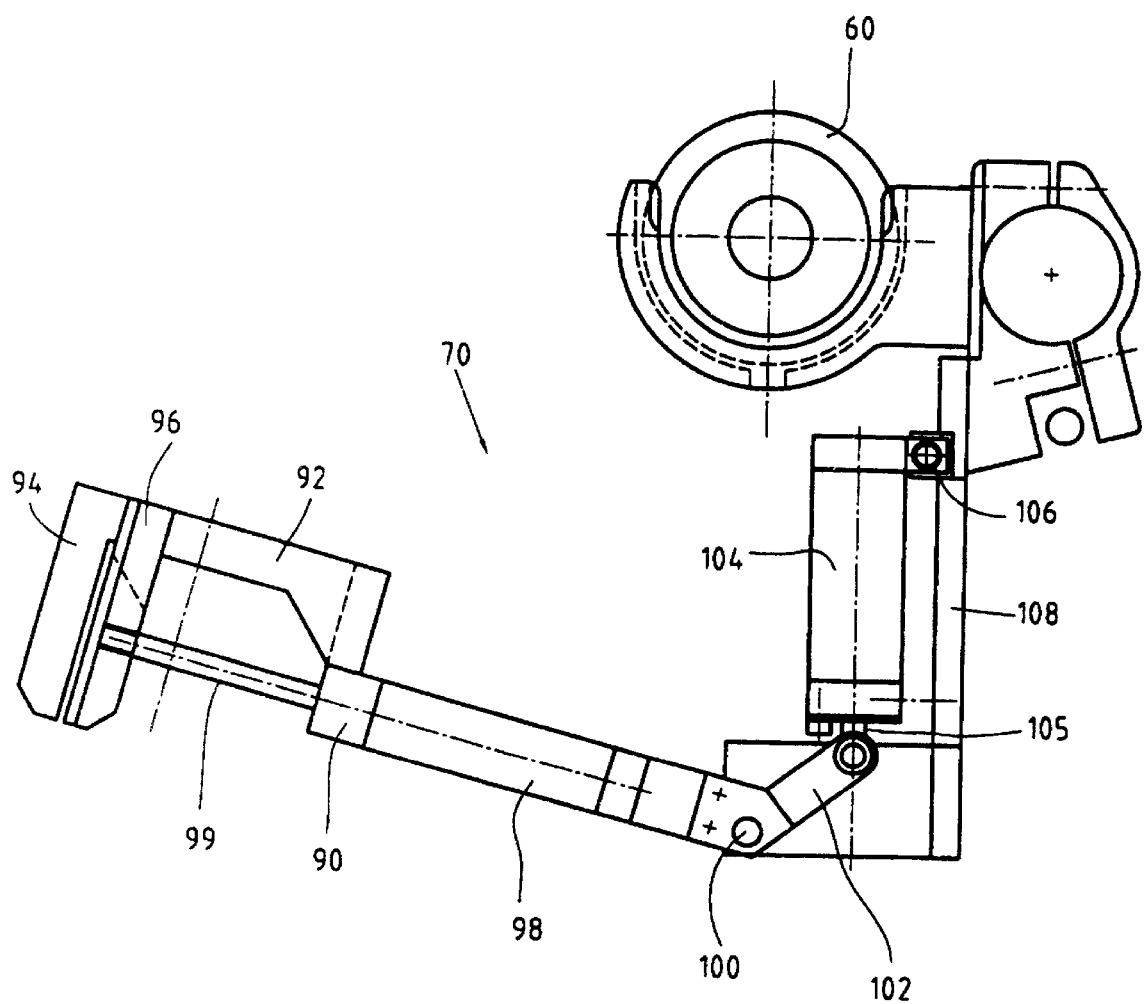
FIG. 4 shows the residual casing remover represented in FIG. 2 as well as the casing brake in another position of the residual casing remover.

FIG. 4 shows the residual casing remover 70 in its position swivelled downwards, which it occupies upon removal of an unfillable sausage casing rest. To ensure that the residual casing remover 70 can perform this swivel movement, casing brake 60 and sausage casing remover 70 must first of all be withdrawn from the corresponding filling tube by swivelling the closing machine 14. Only then is the way clear for the swivel movement of the clamping arm 90 together with the clamp 92. When the casing brake 60 and the residual casing remover 70 have been swivelled as described above such that they are disposed before the orifice of the filling tube, the removal of a sausage casing rest by means of the residual casing remover 70 can be effected in that first of all the clamp 92 is closed in that the first pneumatic cylinder 98 urges the clamping jaw 96 against the other clamping jaw 94. As a result, a sausage casing rest, which is disposed between the casing brake 60 and the orifice of the filling tube, is clamped. Subsequently, the clamping arm 90 is swivelled into the position illustrated in FIG. 4. It takes along the sausage casing rest and removes it in this way from the casing brake 60. This stage, where the clamp 92 is still closed, is illustrated in FIG. 4. To discard the sausage casing rest, the clamp 92 is then opened by withdrawing the clamping jaw 96 by means of the pneumatic cylinder 98. The clamp 92 is then downwardly open, so that the sausage casing rest can fall out between the two clamping jaws 94 and 96. Finally, the clamping arm 90 with still open clamp 92 is swivelled back to its position illustrated in FIG. 2. The residual casing remover 70 and the casing brake 60 can then be moved onto a filling tube which has for instance been freshly equipped with unfilled sausage casing.

Figure 5:
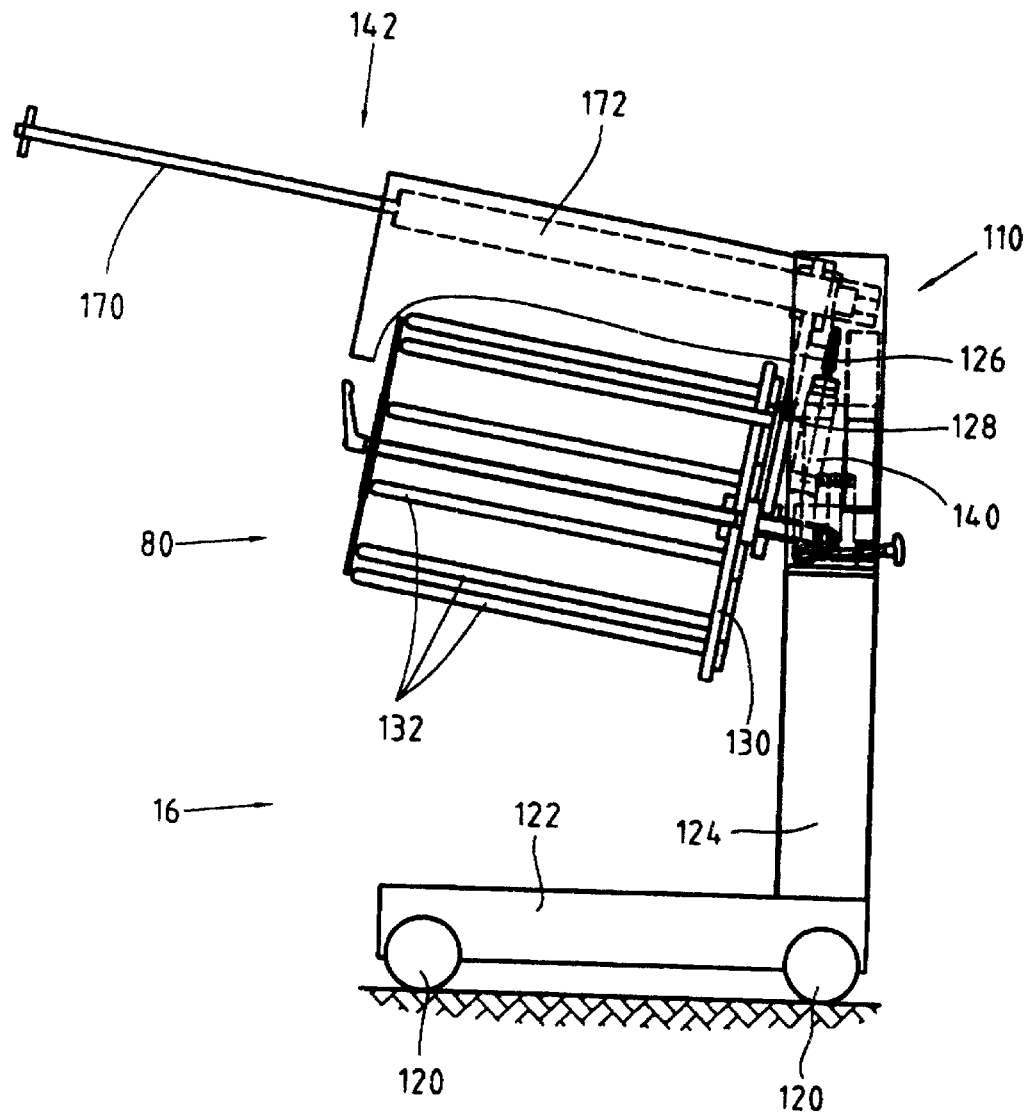
FIG. 5 shows a magazining device in a side view.
Figure 6:
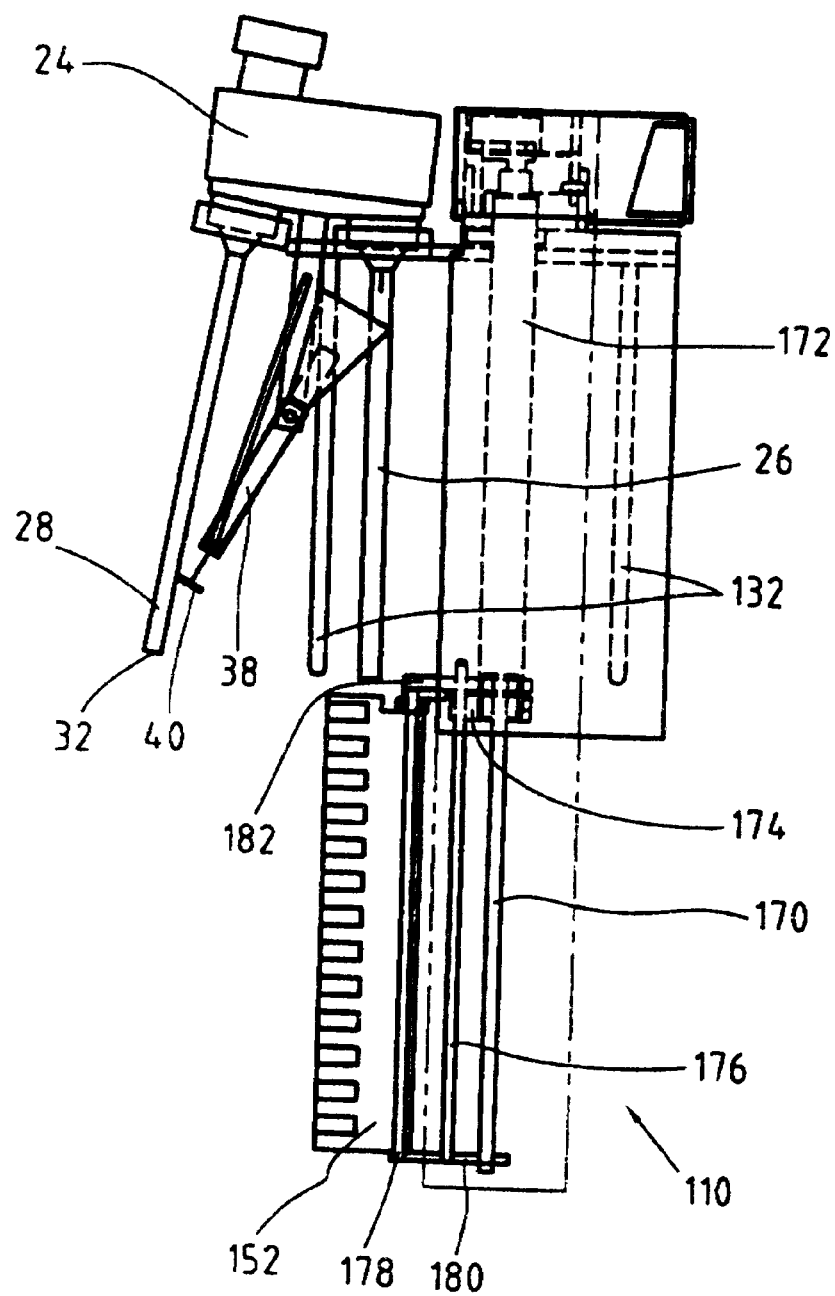
FIG. 6 shows the magazining device of FIG. 5 together with adjacent filling tubes of a filling machine in a top view.
Figure 7:
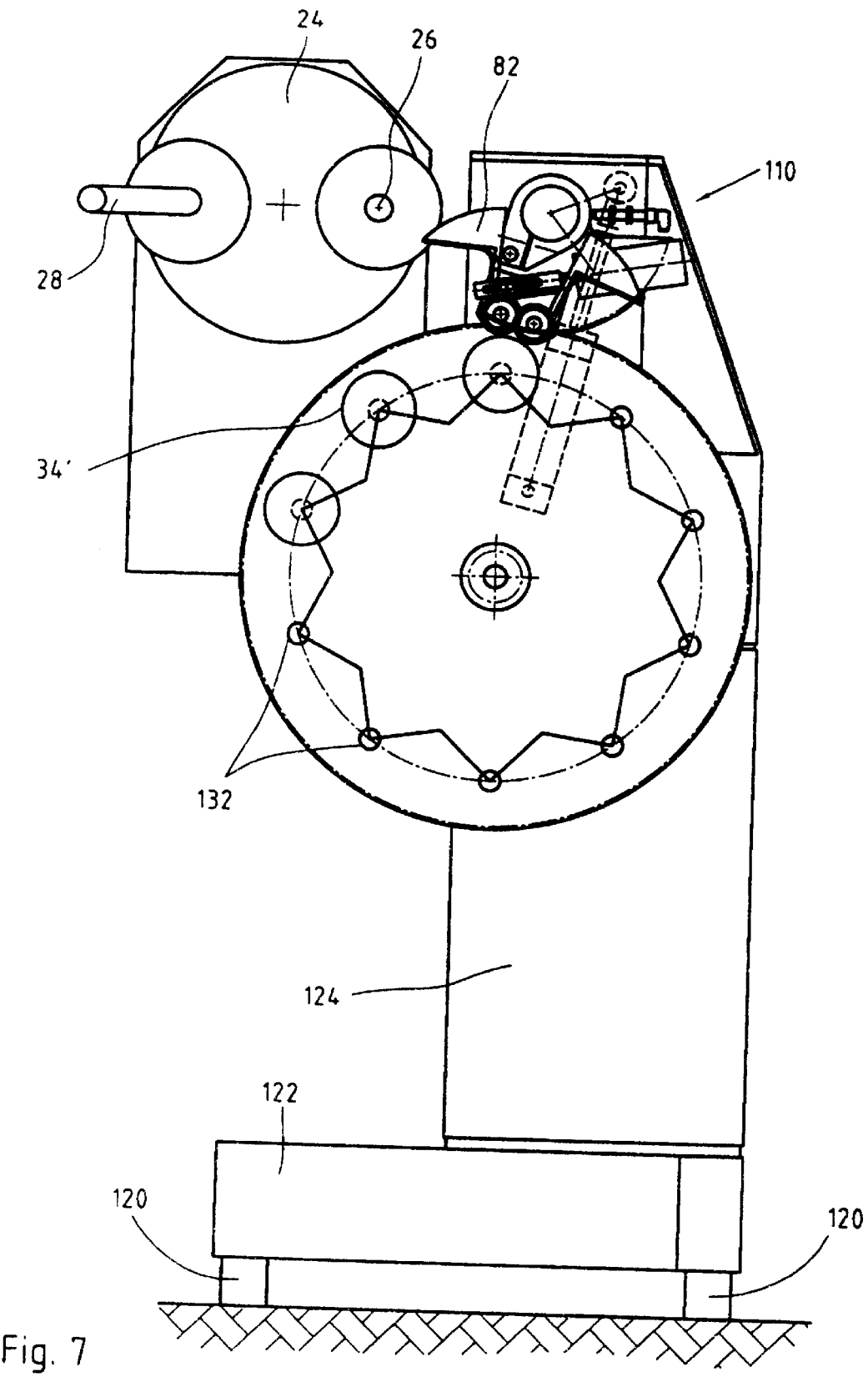
FIG. 7 shows the magazining device of FIGS. 5 and 6 together with the adjacent filling tube of a filling machine in a front view.
Figure 8:
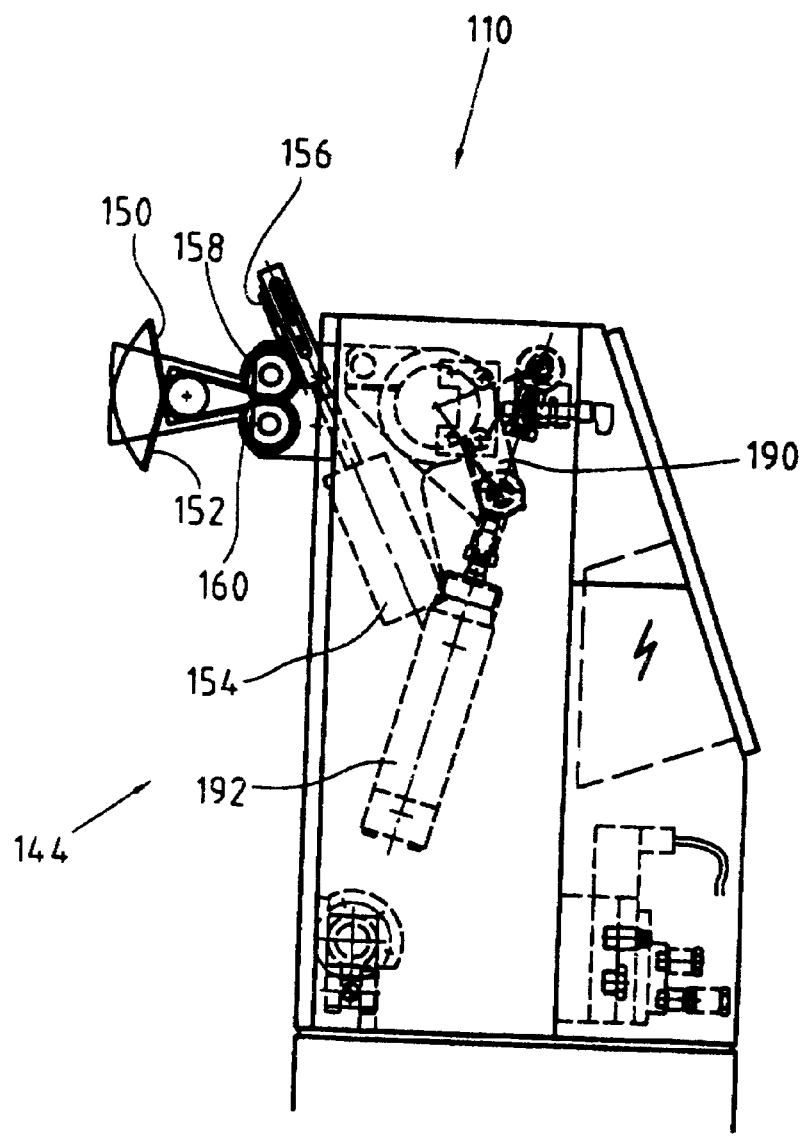
FIG. 8 shows drives for a gripper of the magazining device of FIGS. 6 to 7 in a detail view.
Figure 9:
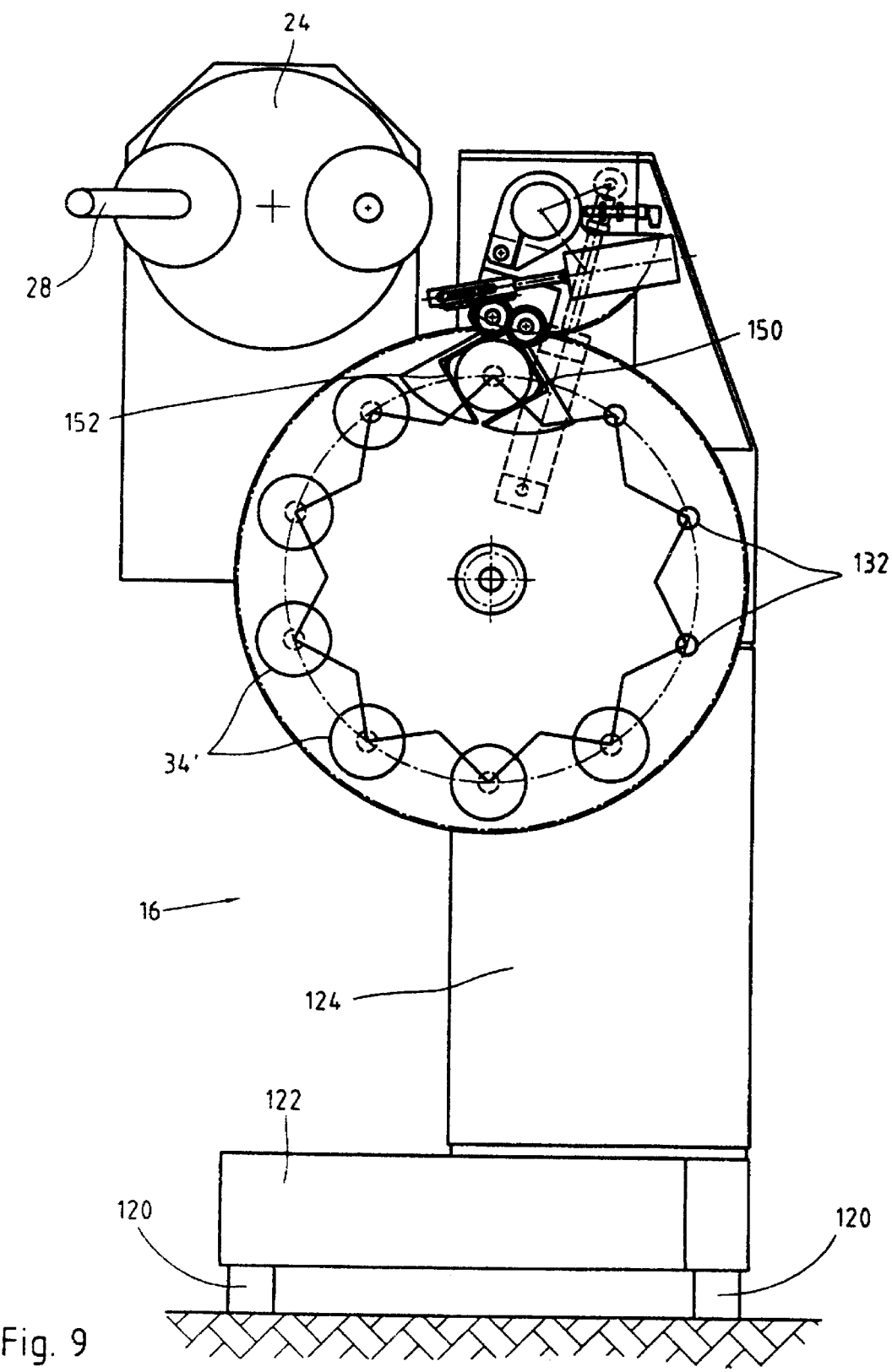
FIGS. 9 to 13 show the view of FIG. 7 in several operating stages of the magazining device.
Figure 10:
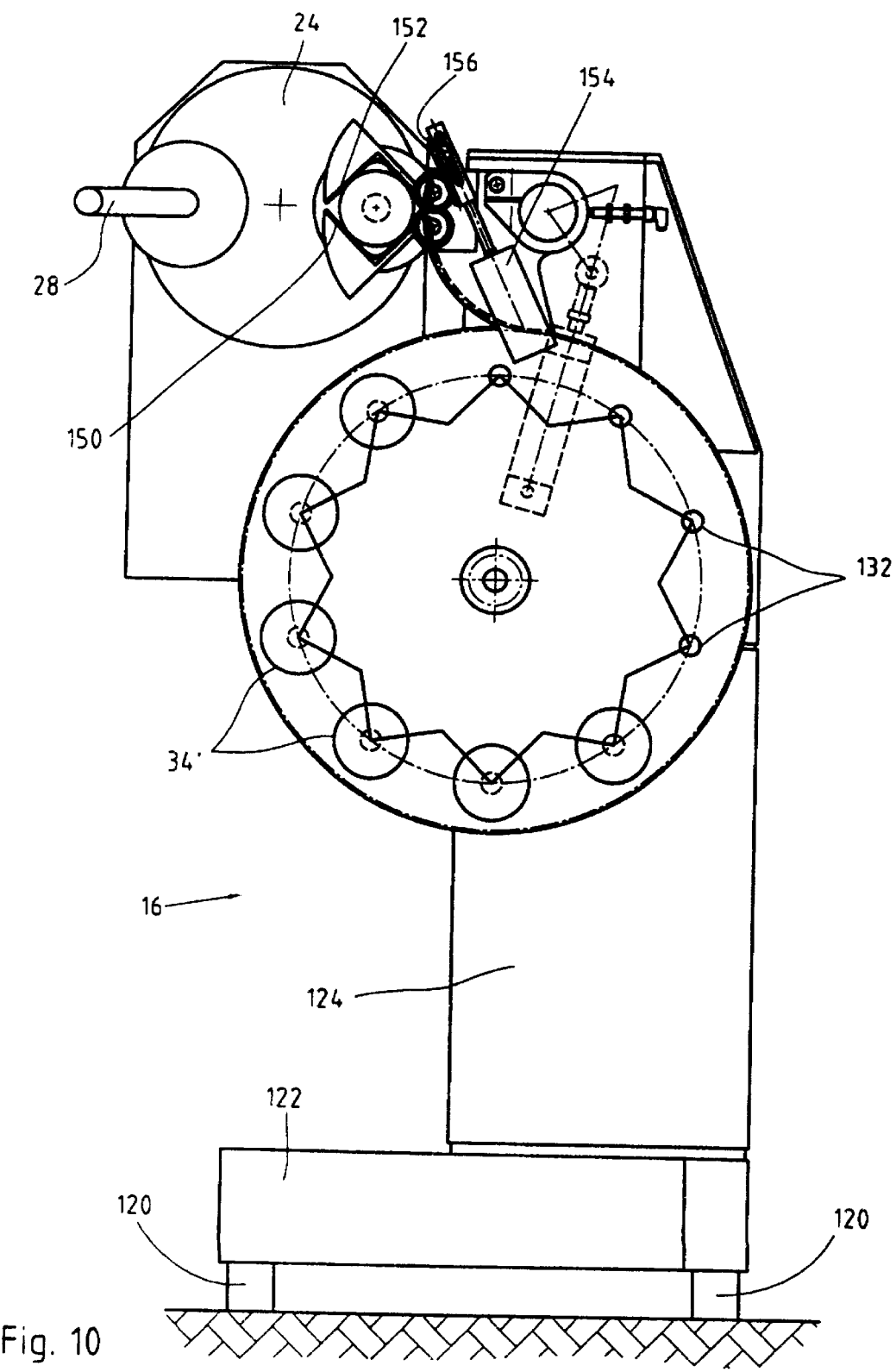
Figure 11:
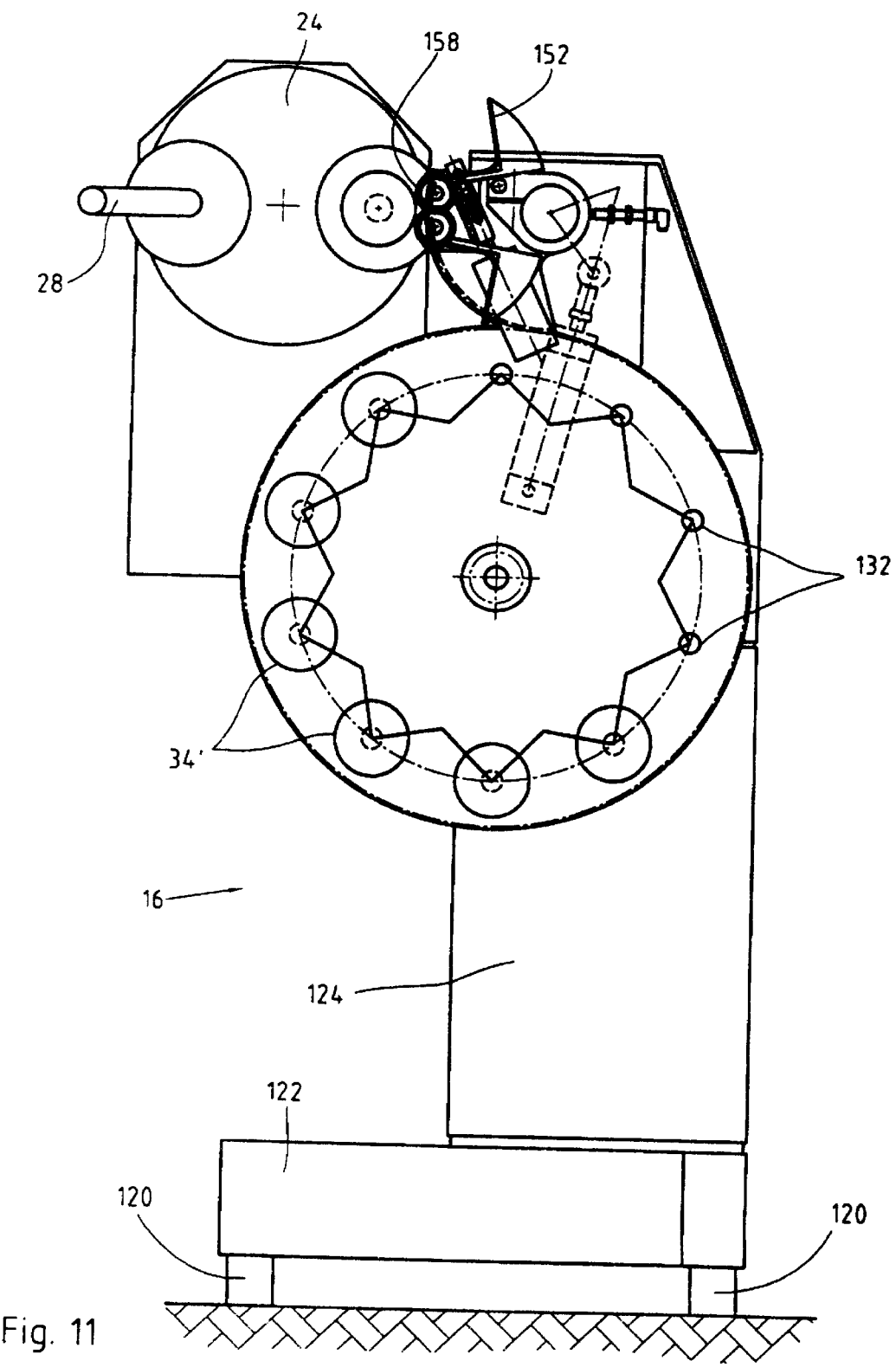
Figure 12:
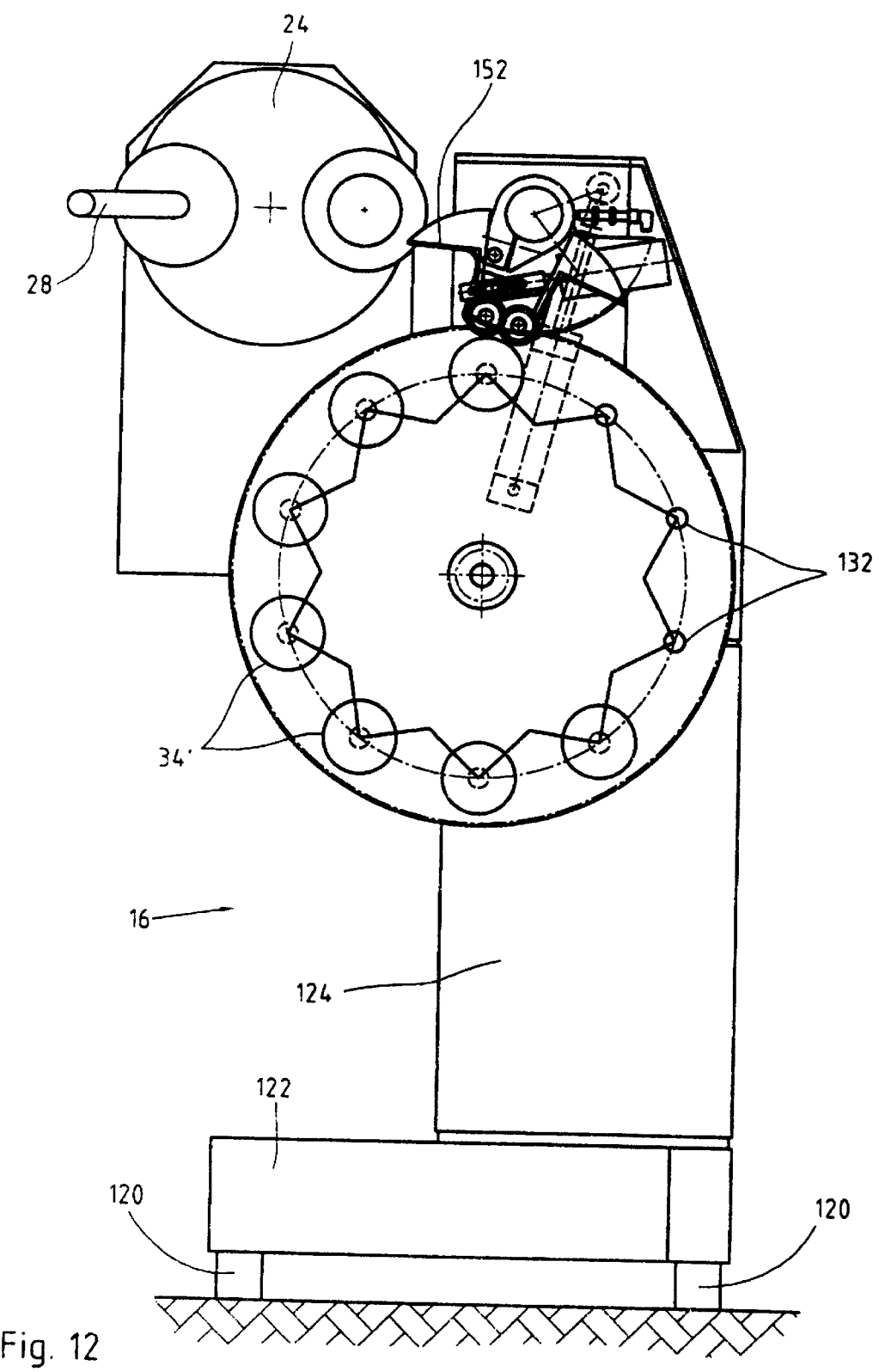
Figure 13:
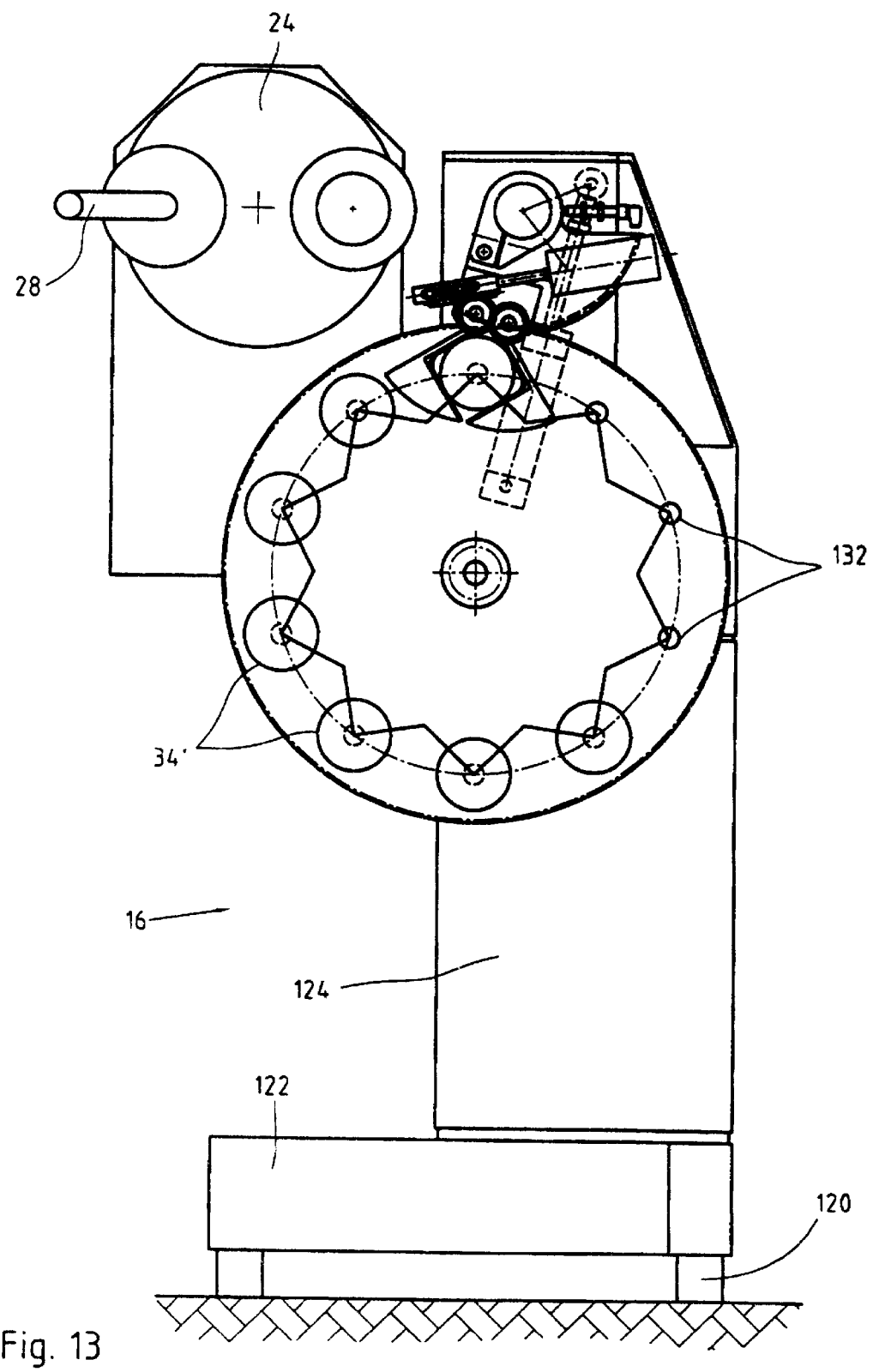

In FIGS. 5 to 8 the magazining device 16 with the pin magazine 80 and a discharge device 110, which encloses the gripper 82, is illustrated in detail, namely in FIG. 5 in a side view, in FIG. 6 in a top view, and in FIG. 7 in a front view. FIG. 8 shows a segment of the drive for the gripper 82.

The magazining device 16 has a machine frame 122 movable on wheels 120. On an upwardly protruding telescopic arm 124 a supporting plate 126 is pivotally mounted about a horizontal axis. For mounting purposes a bearing 128 is used. The supporting plate 126 carries both the pin magazine 80 and the discharge device 110 with the gripper 82. Since the arm 124 is a telescopic arm and the supporting plate 126 can be swivelled about a horizontal axis, the height of pin magazine 80 and gripper 82 as well as the horizontal inclination thereof can be adjusted.

The pin magazine 80 is formed by a carrier 130, which is rotatably mounted about an axis of rotation in the supporting plate 126. The carrier 130 carries a plurality of magazine pins 132, which all extend parallel to the axis of rotation and are aligned parallel to the same. The magazine comprising carrier 130 and magazine pins 132 can be rotated about the axis of rotation by means of a drive not represented.

The discharge device 110 is formed by the gripper 82 as well as three drives, namely a swivel drive 140, a longitudinally moving drive 142 and a closing drive 144. The gripper 82 itself is formed by two gripper claws 150 and 152, which can each be swivelled about an axis extending parallel to the axis of rotation of the pin magazine, so as to open and close the gripper 82. The gripper claws 150 and 152 are driven by the closing drive 144. For this purpose, the closing drive includes a pneumatic cylinder 154, which moves a toothed rack 156 forwards and backwards and in this way drives two gearwheels 158 and 160, which are mounted at the gripper claws 150 and 152. By means of the two meshing gearwheels 158 and 160 it is ensured that the gripper claws 150 and 152 are moving synchronously. The closing drive 144 is provided at the end of a push rod 170, which belongs to the longitudinally moving drive 142. The push rod 170 is guided in a feed cylinder 172 of the longitudinally moving drive 142. It can be moved forwards and backwards pneumatically.

The feed cylinder 172 is pivotally mounted about its longitudinal axis in the supporting plate 126. At its end facing away from the supporting plate 126 it carries a guide plate 174 with a guideway 176 for a guide rod 178, which extends parallel to the push rod 170. At its free end, the push rod 170 is firmly connected with the guide rod 178 via a connecting piece 180. By means of the guide rod 178 it is prevented that the feed cylinder 172 and the push rod 170 can rotate relative to each other about their longitudinal axis. Parallel to the connecting piece 180 there extends a bearing plate 182 fixed at the other end of the guide rod 178. The gripper extends between the connecting piece 180 and the bearing plate 182 and is supported in both of them. The bearing plate 182 encompasses the feed cylinder 172 and is thus supported on the same. It is, however, movable on the feed cylinder 172 in longitudinal direction thereof. In this way, the gripper 82 is rigidly connected with the longitudinally moving drive 142 and by means of the feed cylinder 172 in the push rod 170 can be moved forwards and backwards in longitudinal direction of the two.

As has already been mentioned, the feed cylinder 172 is pivotally mounted in the supporting plate 126. An articulated lever 190 mounted at the feed cylinder 172 in the vicinity of its attachment in the supporting plate 126 serves as swivel drive 142 for the discharge device 110 together with a pneumatic cylinder 192. By means of the swivel drive, the gripper 82 can be swivelled about the longitudinal axis of the feed cylinder 172 and the push rod 170.

The discharge device 110 serves to withdraw an unfilled sausage casing from the pin magazine 80 by means of the gripper 82 and to push the same onto an empty filling tube of a filling machine. By means of its drives, the gripper therefore performs the following movements represented in FIGS. 9 to 13: Proceeding from a retracted position—the extended position is represented in FIG. 6—with open gripper claws 150 and 152 and towards a magazine pin 132 disposed in the transfer position, the closing drive 144 starts to operate and closes the gripper claws 150 and 152, in order to seize a sausage casing provided on the magazine pin 132. Subsequently, the gripper 82 is moved forward to its extended position by means of the longitudinally moving drive 142, thereby withdrawing the empty sausage casing 34' from the magazine pin 132. When the empty sausage casing is in front of the magazine pin 132, the swivel drive 140 starts to operate and swivels the gripper 82 towards the filling tube 26, so that it is in front of the same. Now it is again the feed drive 142 which must pull back the gripper 82 to its retracted position. In this movement, the gripper 82 draws the empty sausage casing 34' onto the filling tube 26. The gripper claws 150 and 152 are subsequently opened by the closing drive 144, and the gripper 82 can swivel back to its starting position.

FIGS. 6 and 7 not only represent the magazining device 16, but also two filling tubes 26 and 28 of a twin system 24. FIG. 6 shows that the axis of rotation of the pin magazine 80 is aligned exactly parallel to the filling tube 26 in the waiting position. Inclination and height of the magazine are also precisely adjusted such that the gripper 82 can draw a sausage casing onto the filling tube 26 in the manner described above.

Figure 14:
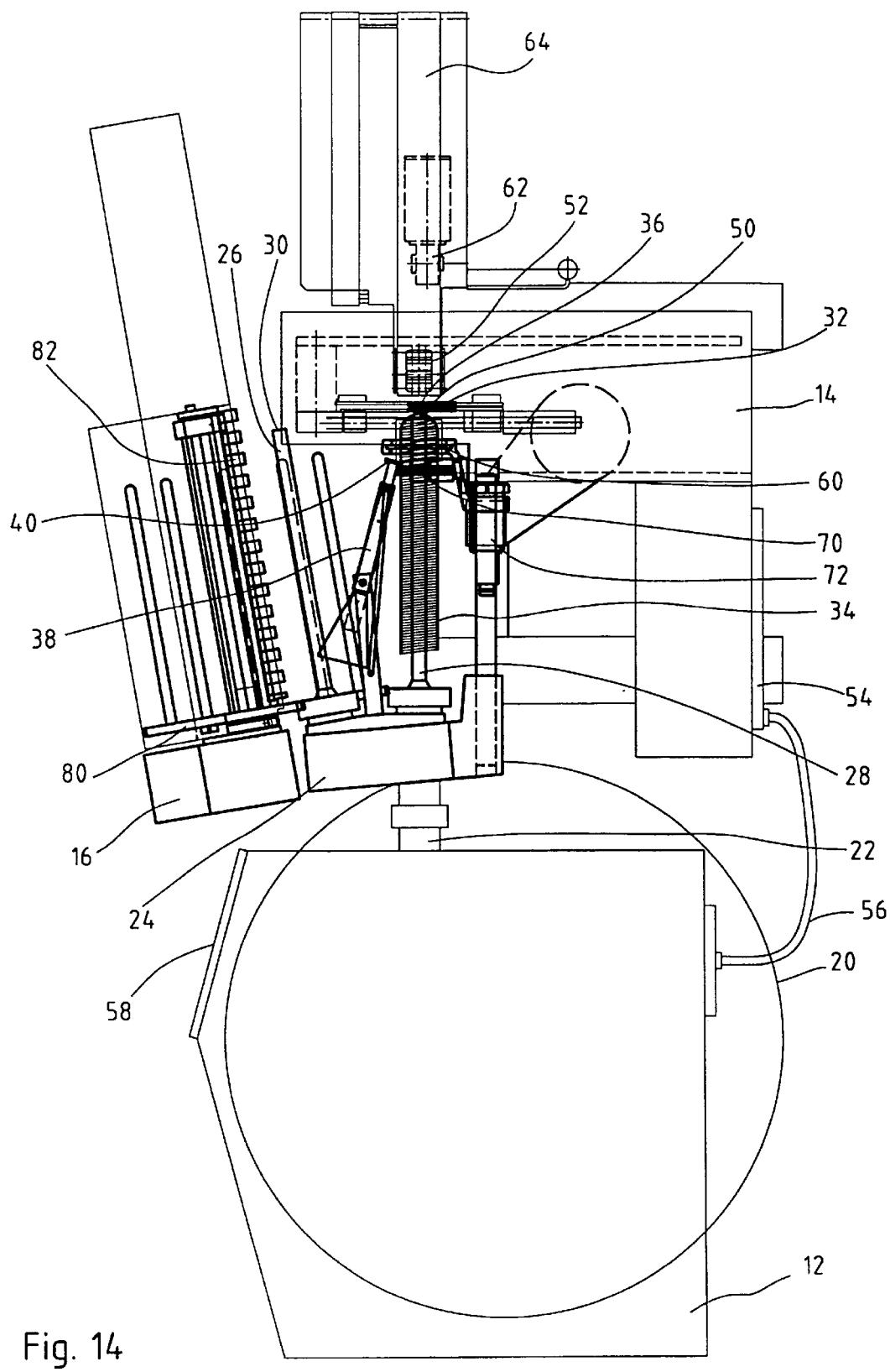
FIGS. 14 to 19 show the view of FIG. 1 in several operating stages of the plant for producing sausages.
Figure 15:
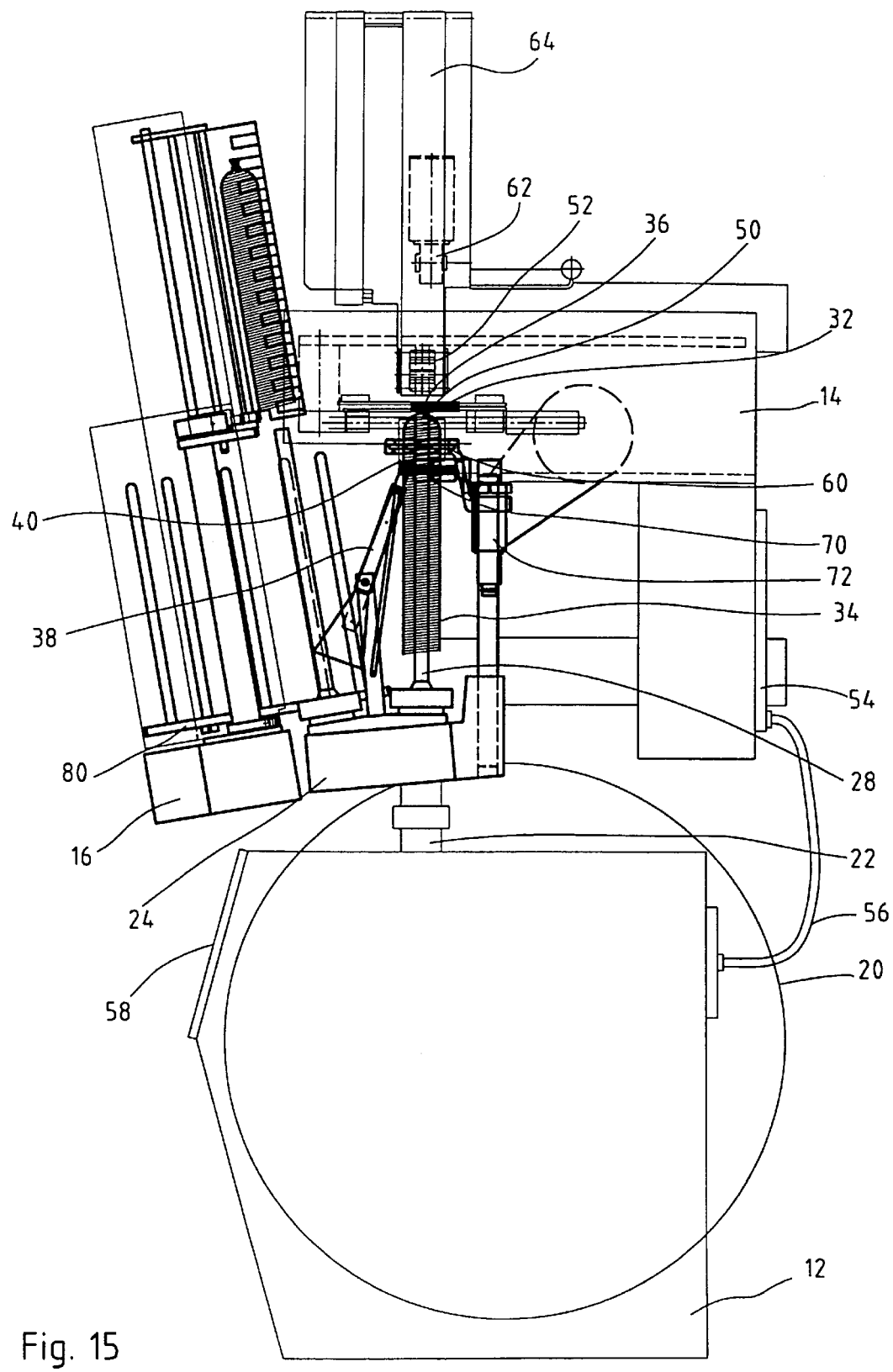
Figure 16:
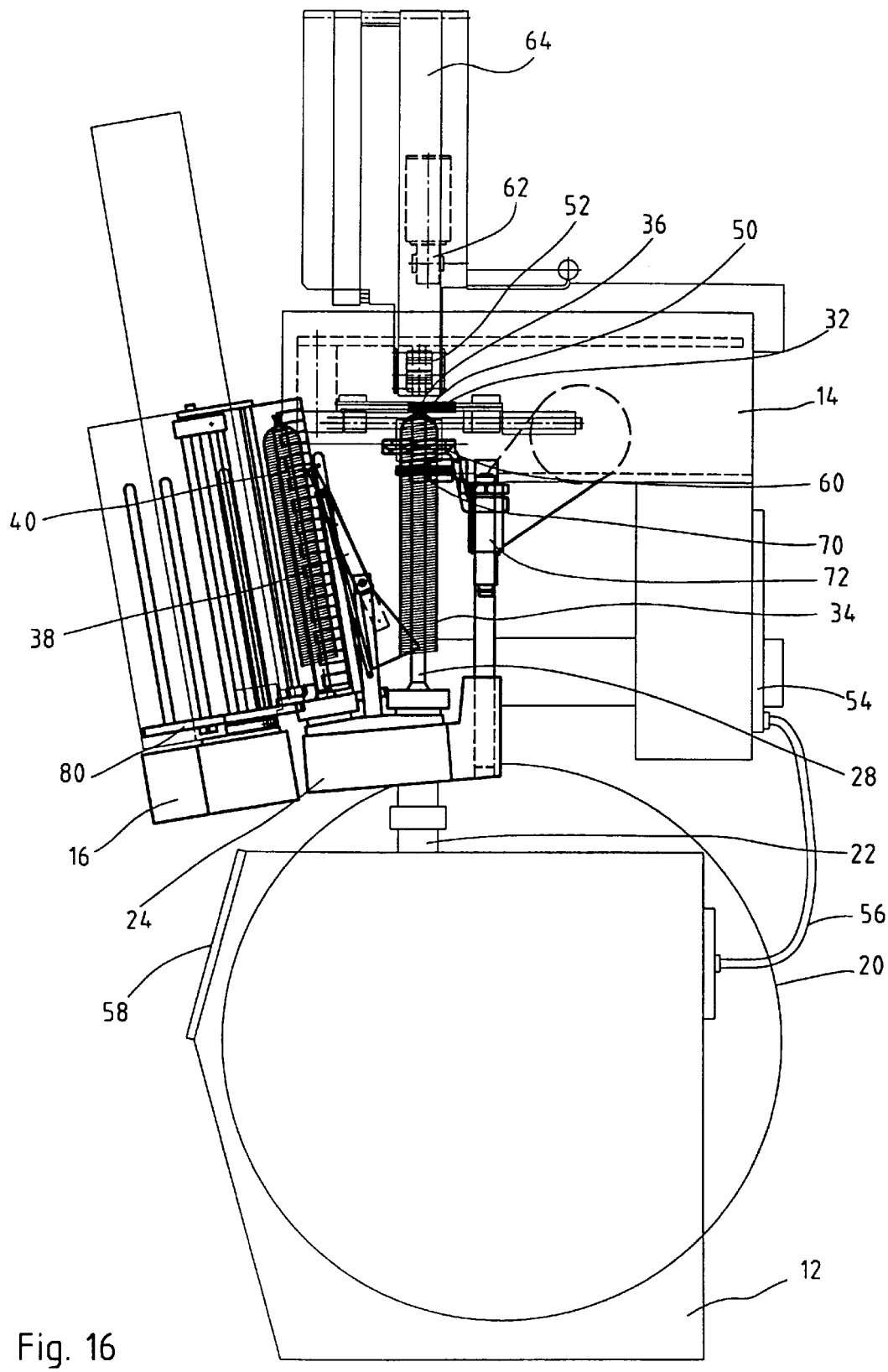
Figure 17:
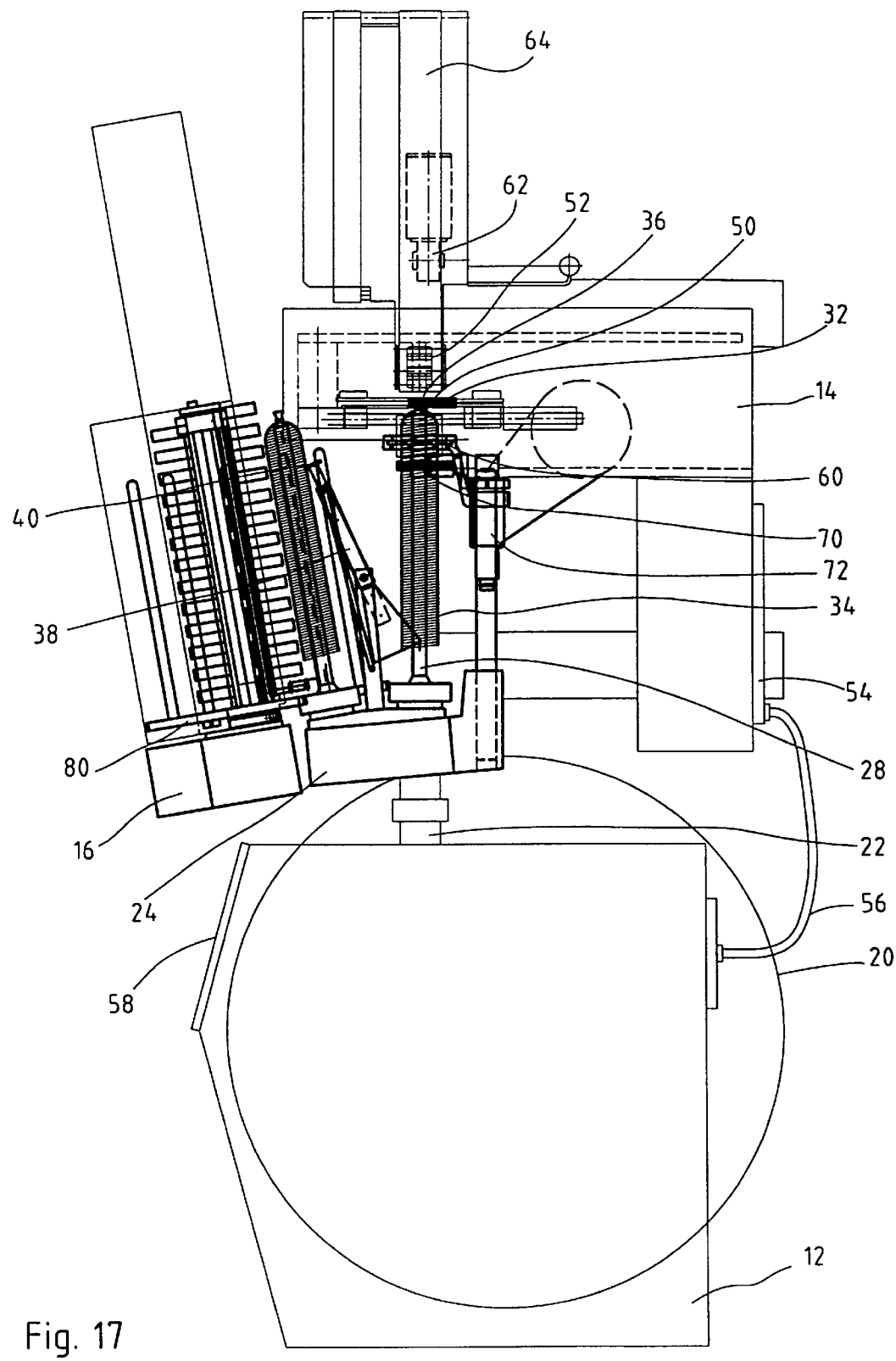

FIGS. 14 to 19 now illustrate the fully automatic exchange of the unfilled rest of a sausage casing 34 on the filling tube 28 in the waiting position for a new unfilled sausage casing. The apparatus illustrated in FIGS. 14 to 19 is the one described already in conjunction with FIG. 1. FIGS. 14 to 17 show a top view of the method also represented in FIGS. 9 to 13, where a sausage casing is withdrawn from the pin magazine and is drawn onto the filling tube 26 in the waiting position. In FIG. 14, the gripper 82 is in its retracted starting position, from which it can seize a sausage casing 34' on that magazine pin 132 which is in the transfer position. In FIG. 15, the gripper 82 has already seized the sausage casing 34', has been moved forwards by the longitudinally moving drive 142 and has already been swivelled by the swivel drive 140, so that the closed gripper 82 with the sausage casing 34 is in front of the orifice 30 of the filling tube 26. Due to the preceding adjustment of inclination and height of the pin magazine 80, the central axes of the filling tube 26 and the sausage casing 34' are precisely aligned in an ideal way. Therefore, the longitudinally moving drive 142 can pull back the gripper 82, in order to push the sausage casing 34' onto the filling tube 26. This condition is represented in FIG. 16. After the gripper 82 has pushed the sausage casing 34' onto the filling tube 26, the gripper 82 is opened by means of the closing drive 144 and swivels back to its starting position in the vicinity of the transfer position of the pin magazine 80. The unfilled sausage casing 34 freshly drawn onto the filling tube 26 is retained on the filling tube 26 by the holding arm 38. This is represented in FIG. 17.

Figure 18:
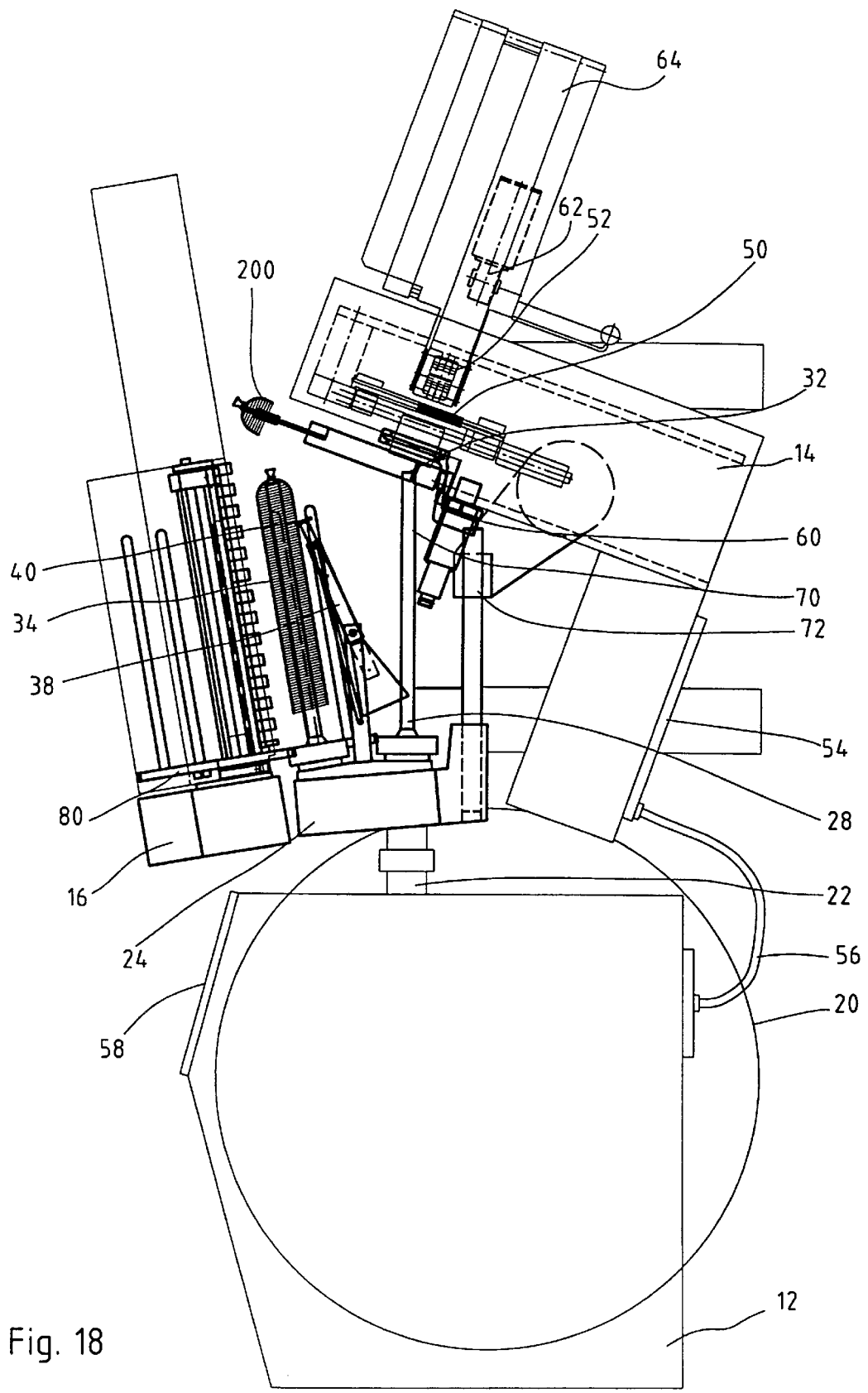

After the unfilled sausage casing 34' has been drawn onto the filling tube 26 in the waiting position, nothing happens with the sausage casing 34' until the sausage casing 34 on the filling tube 28 in the filling position is used up. As soon as this is the case, the closing machine 14 is swivelled away from the filling tube 28. As a result, the casing brake 60 is also withdrawn from the filling tube 28. The residual casing remover 70 is now disposed between the casing brake 60 and the orifice 32 of the filling tube 28. The clamp 92 of the residual casing remover 70 is closed and the residual casing remover 70 is subsequently swivelled away to the side. This is represented in FIG. 18. Subsequently, the clamp 92 of the residual casing remover 70 is opened and a sausage casing rest 200 seized by the residual casing remover 70 falls downwards out of the downwardly open clamp 92 of the residual casing remover 70. The residual casing remover 70 can now be swivelled back to its position beside the casing brake 60. In this position, its clamp 92 is open. There is no more sausage casing rest 200 in the apparatus.

Figure 19:
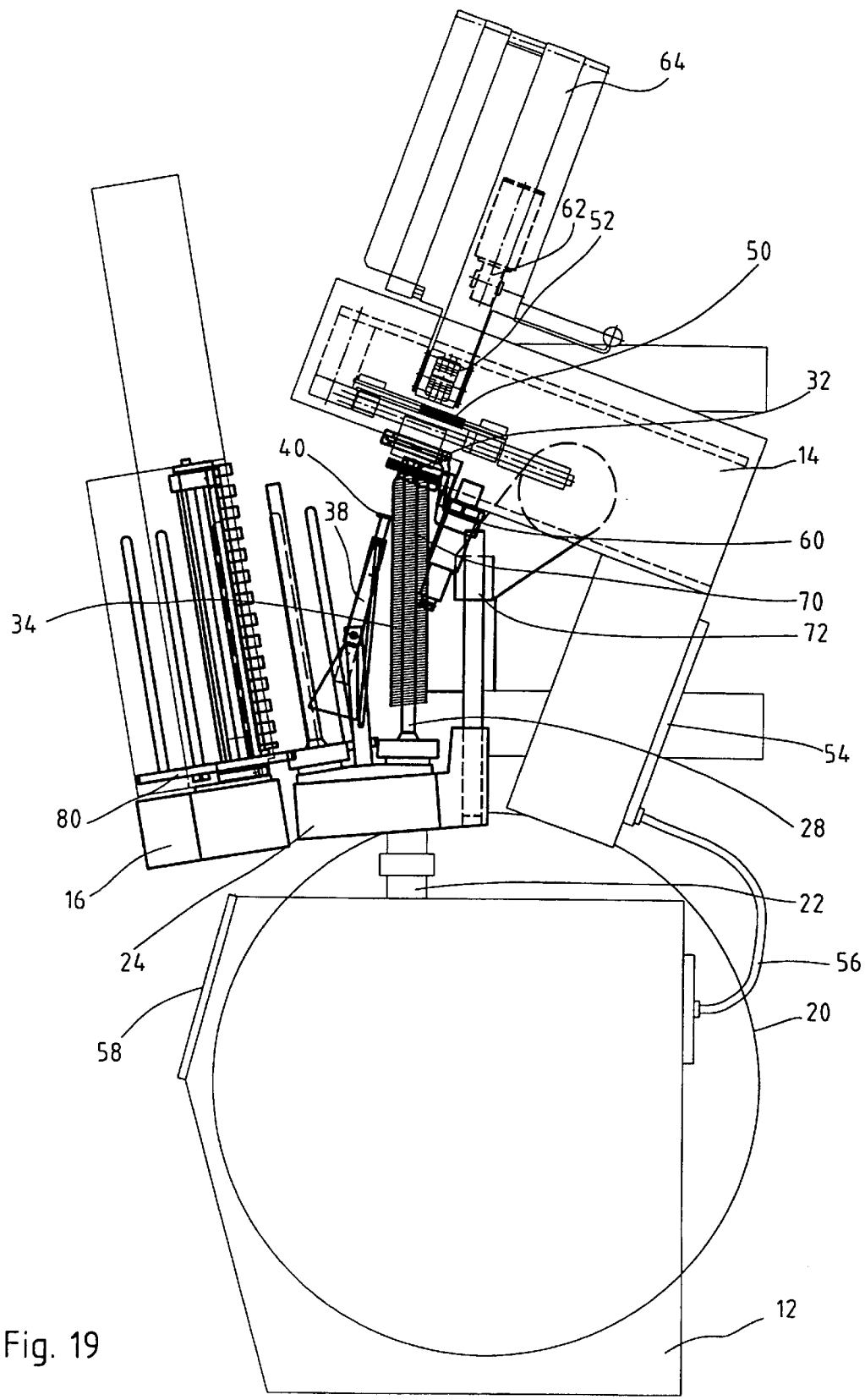

Now, the position of the two filling tubes 26 and 28 is exchanged by swivelling the same. Here as well, the fresh unfilled sausage casing 34' is retained by the holding arm 38. Subsequently, the filling tube 26 is in the filling position. This is represented in FIG. 19. To be able to start to fill the sausage casing 34', the closing machine 14 must finally be swivelled back to the orifice 30 of the filling tube 26. At the same time, the casing brake 60 is moved over the sausage casing 34' onto the filling tube 26. In this way, the initial state represented in FIG. 1 and FIG. 14 is restored.

What is claimed is:

1. An apparatus for producing packages filled with filling, by filling and subsequently closing tubular or bag-shaped sausage casings, comprising a filling machine (12) which has at least one filling tube (26, 28) with an orifice (30, 32) onto which a sausage casing (34) can be drawn and be passed through the filling, in order to fill the sausage casing (34), a closing machine (14) for closing filled sausage casings or sausage casing sections, which with respect to the filling stream is disposed in the filling tube (26, 28) downstream of the orifice (30, 32) of the filling tube (26, 28), a residual casing remover (70) for removing the unfilled remainder of a sausage casing (34) from the filling machine, the closing machine or from both, a magazine (80) for unfilled sausage casings (34'), and a movable gripper (82) for withdrawing an unfilled sausage casing (34') from the magazine (80) and for drawing the same onto the filling tube (26).

2. The apparatus as claimed in claim 1, wherein between the closing machine (14) and the filling machine (12) a data or signal line (56) is provided for transferring operating data pertaining to cycle time, filling weight or diameter and filling speed from the filling machine (12) to the closing machine (14) or vice versa.

3. The apparatus as claimed in claim 2, wherein the closing machine (14) has a spreading crimping element (50) and a stamp and die for setting and closing closure clips, whose movements can be controlled individually in dependence on the operating parameters received from the filling machine (12).

4. The apparatus as claimed in claim 1, comprising a monitor (62), which detects at least one physical parameter of a package produced.

5. The apparatus as claimed in claim 4, wherein at least one controller (54, 58), which is connected to the monitor (62) as well as to the filling machine, the closing machine or both, and is designed such that in the case of a deviation of one or more of the physical parameters detected by the monitor (62) from corresponding desired values it effects a change of one or more of the operating parameters of the filling machine, the closing machine or both: or switches off the same.

6. The apparatus as claimed in claim 1, further comprising a casing brake (60), and wherein the residual casing remover (70) is in direct vicinity of the casing brake 60.

7. The apparatus as claimed in claim 6, wherein the casing brake (60) is movable relative to the filling tube (26, 28) such that it selectively encloses the filling tube (26, 28) close to its orifice (30, 32) or is withdrawn from the filling tube (26, 28), and the residual casing remover (70) is arranged and designed such that with the casing brake (60) withdrawn from the filling tube (26, 28) it is disposed between casing brake (60) and filling tube orifice (30, 32), in order to seize and remove sausage casing (34) present there.

8. A magazine for magazining unfilled sausage casings (34') for an apparatus as claimed in claim 1, comprising a plurality of holders (132) for one sausage casing (34') each.

9. The magazine as claimed in claim 8, wherein the holders are rods (132), onto which the sausage casings (34') can be pushed.

10. The magazine as claimed in claim 8, wherein the holders (132) are movably arranged such that each of them can selectively be moved to a stationary transfer position.

11. The magazine as claimed in claim 10, wherein the holders (132) are fixed at a carrier (130) rotatable about an axis of rotation, so that they extend parallel to the axis of rotation and to each other and all have the same distance from the axis of rotation.

12. The magazine as claimed in claim 11, wherein height and inclination of the axis of rotation can be adjusted.

13. The magazine as claimed in claim 10, further comprising a controllable drive for selectively moving the holders (132) to the transfer position.

14. The magazine as claimed in claim 11, wherein the controllable drive drives the rotatable carrier (130), in order to selectively move the holders (132) to the transfer position.

15. A magazining device including the magazine (80) as claimed in claim 9, comprising a discharge device (110) for receiving a sausage casing at the transfer position, withdrawing a sausage casing from the magazine (80) and pushing the same onto an empty filling tube of a filling machine.

16. The magazining device as claimed in claim 15, wherein the discharge device (110) comprises a gripper (82), which is longitudinally movable in a direction extending parallel to the holders (132) for the unfilled sausage casings (34') and can in addition be swivelled transverse to this direction.

17. The magazining device as claimed in claim 16, comprising separately activatable drivers (140, 142, 144) for opening and closing the gripper (82), for longitudinally moving the gripper (82) and for swivelling the gripper (82).

18. The magazining device as claimed in claim 17, wherein the three drives (140, 140, 144) of the gripper (82) are arranged such that the drive (140) for swivelling the gripper (82) also moves the two other drives (142, 144), and that the drive (142) for longitudinally moving the gripper (82) also moves the drive (144) for opening and closing the gripper (82).

19. A residual casing remover for an apparatus as claimed in claim 1, comprising a pivotally mounted clamping arm (90) with a clamp (92) to be selectively opened and closed at its free end.

20. The residual casing remover as claimed in claim 19, wherein the open clamp (92) includes a U-shaped opening, which in a swivelled position of the clamping arm (90) is downwardly open, in order to discard removed sausage casing.

* * * * *

UNITED STATES PATENT OFFICE
CERTIFICATE OF CORRECTION

Patent No. 6,139,416   Dated 31 October 2000

Inventor(s) William J. Platt

It is certified that error appears in the above-identified patent and that said Letters Patent are hereby corrected as shown below:

Col. 4, line 51, delete [of] and insert -- to --.

Col. 5, line 17, after "in" and before "grid", insert
-- the --.

Signed and Sealed this

Eighth Day of May, 2001

Attest:

NICHOLAS P. GODICI

Attesting Officer   Acting Director of the United States Patent and Trademark Office

UNITED STATES PATENT AND TRADEMARK OFFICE
CERTIFICATE OF CORRECTION

PATENT NO. : 6,139,416
DATED : October 31, 2000
INVENTOR(S) : Klaus Topfer

It is certified that error appears in the above-identified patent and that said Letters Patent is hereby corrected as shown below:

This certificate supercedes certificate of correction issued May 8, 2001, the number was erroneously mentioned and should be deleted since no certificate of correction was granted.

Signed and Sealed this

Sixth Day of November, 2001

Attest:

*Nicholas P. Godici*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO.   : 6,139,416
DATED        : October 31, 2000
INVENTOR(S)  : Topfer

It is certified that error appears in the above-identified patent and that said Letters Patent is hereby corrected as shown below:

Column 14,
Line 12, delete "drivers" and substitute -- drives --

Signed and Sealed this

First Day of January, 2002

Attest:

Attesting Officer

JAMES E. ROGAN
Director of the United States Patent and Trademark Office